United States Patent [19]

Strobeck

[11] Patent Number: 4,622,252
[45] Date of Patent: Nov. 11, 1986

[54] LAMINATE WITH PLASTIC FILM

[75] Inventor: George W. Strobeck, Greenville, S.C.

[73] Assignee: Phillips Petroleum Company, Bartlesville, Okla.

[21] Appl. No.: 427,246

[22] Filed: Sep. 29, 1982

[51] Int. Cl.⁴ .......................... B32B 3/02; B32B 11/10
[52] U.S. Cl. ...................................... 428/88; 428/291; 428/352; 428/480; 428/489; 428/490; 428/523
[58] Field of Search ............... 428/489, 490, 352, 291, 428/88, 40, 523, 480

[56] References Cited

U.S. PATENT DOCUMENTS

| | | | |
|---|---|---|---|
| 2,847,948 | 8/1958 | Truitt | 428/189 |
| 3,474,625 | 10/1969 | Draper et al. | 405/270 |
| 3,486,964 | 12/1969 | Brunlid | 428/57 |
| 3,741,856 | 6/1973 | Hurst | 428/246 |
| 3,853,682 | 12/1974 | Hurst | 428/40 |
| 3,900,102 | 8/1975 | Hurst | 428/40 X |
| 4,248,926 | 2/1981 | Tajima et al. | 428/489 X |

Primary Examiner—Thomas J. Herbert
Attorney, Agent, or Firm—Stephen E. Reiter

[57] ABSTRACT

A repair or waterproofing laminate having a flexible sheet-like permeable or semipermeable support in face-to-face contact with a sheet-like bituminous mastic and further having an impermeable plastic film in contact with, and permanently adhered to, the portion of the mastic that extends beyond at least one of the ends or edges of the support.

12 Claims, 5 Drawing Figures

LAMINATE WITH PLASTIC FILM

This invention relates to repair or waterproofing laminates. This invention also relates to watertight joints for such laminates.

BACKGROUND

Repair or waterproofing laminates are known in the art. A typical laminate is comprised of a flexible sheet-like permeable or semipermeable support in face-to-face contact with a sheet-like bituminous mastic. These materials are used to repair, waterproof, strengthen or otherwise improve roads, roofs, building foundations, bridge decks, parking decks and the like. As repair materials they can be applied directly to the cracked or weakened areas of any given substrate (i.e. road, concrete surface, roof, etc.). The laminates can also be used during construction to reduce the need for subsequent repair and to otherwise improve the quality of the project. A wide range of other applications for such laminates is known to those persons of skill in the art.

The repair or waterproofing laminates to which this invention pertains are characterized by an extended mastic construction. This means that the bituminous mastic extends beyond at least one end of the support. An extended mastic construction is illustrated in FIG. 1.

FIG. 1 shows a side view of a sheet-like permeable or semipermeable support 1 in face-to-face contact with a bituminous mastic 2. The face-to-face contact occurs at the support-mastic interface 3. Note that a portion 4 of the mastic 2 extends beyond the edge or end of the support 1. This extension 4 of mastic represents an extended mastic construction.

The extended mastic construction is useful when one strip of repair or waterproofing laminate is partially overlapped by another strip of the material. The extended mastic construction allows for a mastic-to-mastic contact between the strips. FIG. 2 illustrates this overlapping of strips.

FIG. 2 shows two strips of the repair or waterproofing laminate applied to a substrate 5 (e.g. road, concrete surface, roof, etc.). Note that both mastics 2 are in contact with substrate 5. The extended portion of the mastic of the strip furthermost to the left is in contact with the mastic of the other strip. This mastic-to-mastic contact occurs at the interface 6. The mastic-to-mastic contact provides a watertight joint or seal.

The bituminous mastic 2 is, by design, very "sticky". This presents problems and difficulty with respect to storing, transporting and handling of the laminate. For this reason release papers are used to cover the exposed portions of the mastic (i.e. those portions not covered by the support 1). Each release paper is treated with silicone on the face of the paper in contact with the mastic 2. FIG. 3 illustrates the positions of the release papers. Release paper 7 covers the entire face of the mastic 2. Note that this particular face of the mastic is not the face of the mastic in contact with the support 1 but rather is the reverse face. Release paper 7 is called the primary release paper. Release paper 8, which is typically a narrow strip, covers the extended portion 4 of the mastic 2. Note that release paper 8 and support 1 are in contact with the same face of the mastic 2. Release paper 8 covers that portion of the mastic face not covered by the support 1. Release paper 8 is referred to as the secondary release paper.

With the release papers in place the strip of repair or waterproofing laminate can be rolled up and unrolled without interference from the "sticky" mastic. In practice rolls of the laminate are transported to the repair or construction site. The release papers are carefully removed on site as the laminate is applied to the substrate (i.e. road, concrete surface, roof, etc.). Removal of the secondary release paper requires an extra handling step. Once the secondary release paper is removed the exposed mastic can be dirtied or cause handling and disposal problems. Occasionally removal of the secondary release paper causes removal of some of the mastic.

OBJECTS OF THE INVENTION

It is an object of this invention to provide a replacement for the secondary release paper.

It is another object of this invention to provide a repair or waterproofing laminate having an extended mastic construction which can be used without the need for removal of a secondary release paper.

It is a further object of this invention to make application of the laminate simpler and to eliminate the problems associated with a secondary release paper.

These objects and other objects and advantages of my invention will be apparent to a person of skill in the art upon reading this disclosure and the appended claims.

BRIEF SUMMARY OF THE INVENTION

Figure 1:
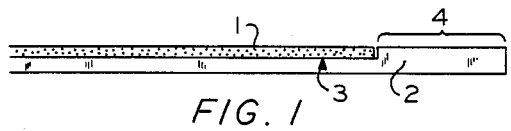
FIG. 1 illustrates the extended mastic construction of a repair or waterproofing laminate.
Figure 2:
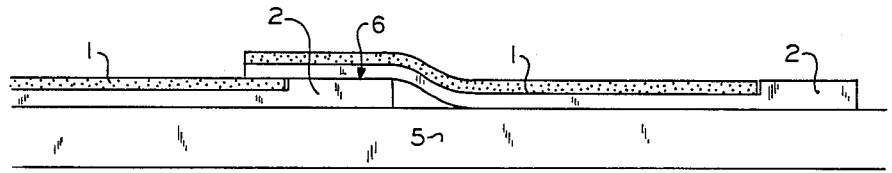
FIG. 2 illustrates the laminate of FIG. 1 overlapped by a second laminate to create a mastic-to-mastic seal.
Figure 3:
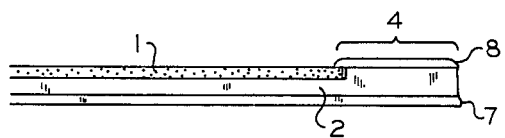
FIG. 3 illustrates the position of the release papers on the laminate.

A repair or waterproofing laminate is comprised of a flexible sheet-like permeable or semipermeable support in face-to-face contact with, and permanently adhered to, a sheet-like bituminous mastic. The laminate has an extended mastic construction in that the mastic extends beyond at least one end or edge of the support. A plastic film is in face-to-face contact with, and permanently adhered to, the surface of the mastic extending beyond the support. Both the support and the plastic film are on the same side of the mastic (i.e. in contact with different portions of the same mastic face). Preferably, the repair or water-proofing laminate is further comprised of a removable protective means which substantially covers the reverse face of the mastic (i.e. the face not in contact with the support and the plastic film).

When a strip of the repair or waterproofing laminate is applied to a substrate the plastic film is not removed but rather remains permanently in place. The protective means covering the reverse mastic face, if present, is removed. When the laminate is overlapped by another laminate a mastic-to-plastic film-to-mastic contact results.

DETAILED DESCRIPTION OF THE INVENTION

The repair or waterproofing laminate of this invention is comprised of (1) a flexible sheet-like support, (2) a sheet-like bituminous mastic, and (3) a plastic film. Preferably, the laminate also includes (4) a removable protective means.

The sheet-like support is in face-to-face contact with the sheet-like mastic. The face of the mastic in contact with the support is arbitrarily designated as the "upper" face. The other face of the mastic (i.e. the face not in contact with the support) is arbitrarily designated as the "reverse" face. The terms "upper" and "reverse" are not intended to define any particular orientation of the laminate. Their sole purpose is to aid in distinguishing the two faces of the sheet-like mastic.

The laminate has an extended mastic construction. This means that the mastic extends beyond at least one end or edge of the support thus leaving a portion of the upper face of the mastic uncovered by the support. The plastic film is in face-to-face contact with, and permanently adhered to, the portion of the "upper" mastic face that extends beyond the support. The length of the mastic extending beyond the support can vary and this invention is not limited to any particular maximum or minimum length. An extension of about ½ inch to about 2 inches is typically used.

When the protective means is employed it is used to cover or substantially cover the "reverse" face of the mastic. The protective means is removable from the "reverse" mastic face.

The term "sheet-like" has been used to modify both the support and the mastic. It is intended that this term be broadly and liberally interpreted. Sheet-like means that the length and width of the material are much greater than its thickness. It is, in effect, a pseudo-two-dimensional object in that two of the three dimensions are dominant. The term does not require that the thickness of the material (i.e. support or mastic) be uniform. For example, the extended portion of the mastic can be (though it is not required to be) thicker than the rest of the mastic.

The flexible sheet-like support is made of a permeable or semipermeable material. Permeable or semipermeable is intended to mean that water or water vapor can pass through the support. The support can be a woven or nonwoven fabric. The fabric can be made of inorganic or organic fibers. The fibers can be natural or synthetic fibers. The fibers can be staple fibers, continuous filaments or any other type of fiber. The support can be, for example, a woven or nonwoven polyolefin fabric.

The preferred fabric of this invention is a nonwoven polypropylene fabric. The fabric is preferred because of its high structural integrity. This preferred fabric can be made from about 2 to about 6 denier staple of about 2 to about 4 inches in length. A batt of these fibers can be needle-punched and partially fused on one side by means of heated nip rolls and/or infrared fusion. The preferred fabric is about 1 to about 5 mm thick.

The term bituminous mastic is intended to include asphalt, tar, pitch and the like. These materials are obtained, for example, by the distillation of carbon-rich materials (e.g. coal, wood, petroleum, etc.). Although the invention is not limited thereto, the composition of the bituminous mastic can include the presence of a natural or synthetic rubber (i.e. the mastic can be a blend of rubber and bituminous material). A rubberized asphalt, for example, can be used as the mastic. The bituminous mastic can optionally contain other components such as, for example, antistripping agents, extender oils, mineral fillers, antidegradants and the like.

The bituminous mastic can be coated on or otherwise applied to the support.

The plastic film can be made of any plastic which is substantially impermeable to water or water vapor. Polypropylene, polyester, polyethylene and cellulose acetate represent examples of suitable plastics. Adhesion between the plastic film and the bituminous mastic will be very strong. It is intended that the plastic film remain permanently adhered to the mastic. The thickness of the film is not critical. Typically it can be about 1 mil thick. The film should be shaped and sized such that it can substantially cover the extended portion of the "upper" face of the mastic.

The protective means can be any material that can adhere to and cover the "reverse" face of the mastic. The protective means must also be removable so that the "reverse" face of the mastic can be applied to the intended substrate. Unlike the plastic film, the protective means is not permanent, i.e. it is removed prior to use. The protective means is typically a material treated with a release agent. The release agent can be, for example, silicone. A silicone-treated paper, plastic or other material is the preferred protective means.

Figure 4:
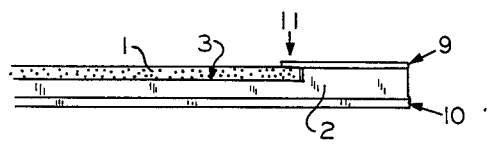
FIG. 4 illustrates an embodiment of the inventive laminate.

FIG. 4 depicts an embodiment of the inventive laminate. The flexible sheet-like permeable or semipermeable support 1 and the bituminous sheet-like mastic 2 are in face-to-face contact at the interface 3. Note the extended mastic construction. A plastic film 9 is in face-to-face contact with, and permanently adhered to, the surface of the "upper" mastic face that extends beyond the support 1. Note that the plastic film 9 overlaps the support 1 as indicated by 11. This overlap is entirely optional. A protective means 10, such as a silicone-treated release paper, covers the "reverse" face of the mastic.

The laminate of FIG. 4 can be rolled up and unrolled without damage to the mastic and without damage caused by the mastic. In the form of a roll the laminate is much easier to store or transport.

Figure 5:
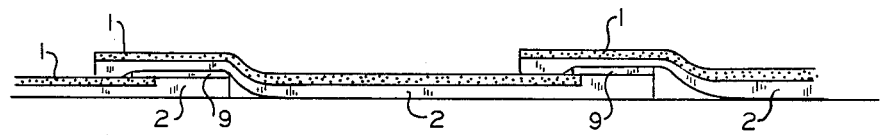
FIG. 5 illustrates the creation of mastic-to-plastic film-to-mastic seals by overlapping the inventive laminates.

FIG. 5 illustrates the overlapped relationship of 3 strips of the repair or waterproofing laminate. Each of the 3 laminate strips, when unrolled, is in rectangular form. The dimensions of the rectangle can, of course, vary widely. By way of example, the Phillips Fibers Corporation of Greenville, S.C., sells the laminate in two sizes: 101 feet in length by 1 foot in width; and 45 feet in length by 3 feet in width. The thickness of both products is about 98 mils.

With reference to the impermeable plastic films 9 in FIG. 5 it is clear to see that overlapping of the laminate strips in the manner shown results in a mastic-to-plastic film-to-mastic seal. The plastic film 9 is permanently adhered to mastic 2 on each of its sides. A watertight joint or seal is thus formed by the overlap.

Note that use of the plastic film keeps the mastic covered at all times so that it cannot be dirtied. Note also that use of the plastic film makes application of the strips simpler and eliminates the handling and disposal problems associated with use of the secondary release paper. The plastic film has proven in actual practice to be of significant advantage to those of skill in the art.

I claim:
1. A laminate comprising:

(a) a flexible sheet-like permeable or semipermeable support,
(b) a sheet-like bituminous mastic having an upper face and a reverse face,
(c) a plastic film, and
(d) a removable protective means;
wherein said support is in face-to-face contact with, and permanently adhered to, said upper face of said mastic; wherein said mastic extends beyond at least one end or edge of said support to create an extended mastic construction; wherein said plastic film is in face-to-face contact with, and permanently adhered to, the surface of said upper face of said mastic extending beyond said support; and wherein said removable means is adhered to and substantially covers the reverse face of said mastic.

2. The laminate of claim 1 in the form of a roll.

3. A laminate as recited in claim 1 wherein said support is a woven or nonwoven fabric.

4. A laminate as recited in claim 3 wherein said fabric is comprised of polyolefin.

5. A laminate as recited in claim 1 wherein said protective means is a silicone-treated material.

6. A laminate as recited in claim 1 wherein said support is a nonwoven polypropylene fabric.

7. A laminate as recited in claim 1 wherein said mastic is a rubberized asphalt.

8. A laminate as recited in claim 1 wherein said mastic is comprised of rubber and bituminous material.

9. A laminate as recited in claim 1 wherein said plastic film is comprised of polypropylene, polyester, polyethylene or cellulose acetate.

10. A laminate as recited in claim 5, 7, 8 or 9 wherein said support is a polyolefin fabric.

11. A laminate as recited in claim 1 wherein said support is a nonwoven polypropylene fabric; wherein said mastic is a rubberized asphalt mastic; wherein said plastic film is comprised of polypropylene; and wherein said protective means is a silicone-treated release paper.

12. The laminate of claim 11 in the form of a roll.

* * * * *